(12) United States Patent
Seko et al.

(10) Patent No.: US 6,300,411 B1
(45) Date of Patent: Oct. 9, 2001

(54) AQUEOUS RESIN COMPOSITION

(75) Inventors: Toshiya Seko; Kazuhide Hayama; Yasuo Kitani, all of Yokkaichi; Kazumasa Kinugasa, Tokyo, all of (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/272,340

(22) Filed: Mar. 19, 1999

(30) Foreign Application Priority Data

Mar. 20, 1998 (JP) .................................................. 10-072761

(51) Int. Cl.$^7$ ................................ C08L 61/22; C08F 8/32
(52) U.S. Cl. ......................... 524/598; 524/592; 525/380; 525/381
(58) Field of Search .................................... 524/592, 598; 525/380, 381

(56) References Cited

U.S. PATENT DOCUMENTS 3,345,336   10/1967   Kuhlkamp et al. .

FOREIGN PATENT DOCUMENTS

| 46-20053 | 6/1971 | (JP) . |
| 57-3850 | 1/1982 | (JP) . |
| 57-3857 | 1/1982 | (JP) . |
| 58-20991 | 4/1983 | (JP) . |
| 58-104902 | 6/1983 | (JP) . |
| 58-96643 | 6/1983 | (JP) . |
| 60-38468 | 2/1985 | (JP) . |
| 61-6861 | 3/1986 | (JP) . |
| 62-25163 | 2/1987 | (JP) . |
| 62-62853 | 3/1987 | (JP) . |
| 64-20256 | 1/1989 | (JP) . |
| 1-234416 | 9/1989 | (JP) . |
| 3-68669 | 3/1991 | (JP) . |
| 4-227947 | 8/1992 | (JP) . |
| 4-249587 | 9/1992 | (JP) . |
| 6-80619 | 3/1994 | (JP) . |
| WO 96/01252 | 1/1996 | (WO) . |

*Primary Examiner*—Tae H. Yoon
(74) *Attorney, Agent, or Firm*—Oblon, Spivak, McClelland, Maier & Neustadt, P.C.

(57) ABSTRACT

The present invention discloses an aqueous resin composition containing (A) a copolymer of (a) a monomer having one or more aldehyde groups or ketone groups, and a radical polymerizable unsaturated bond, in a molecule, with (b) a monomer having a radical polymerizable unsaturated bond copolymerizable with the monomer (a); (B) a hydrazine compound of the following formula (1)

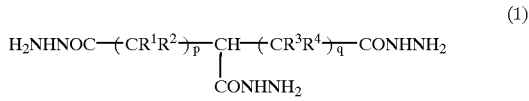

(1)

where $R^1$, $R^2$, $R^3$ and $R^4$ independently represent a hydrogen atom, or a hydroxyl group, p denotes an integer of 0 to 3, and q denotes an integer of 2 to 8, provided that the relationships $p+q \leq 8$ and $p<q$ are satisfied; and an aqueous medium. When the aqueous resin composition of the present invention is applied and then dried, a film excellent in film intactness, transparency, whitening after water immersion, and adhesion after water immersion can be formed.

17 Claims, No Drawings

AQUEOUS RESIN COMPOSITION

BACKGROUND OF THE INVENTION

1. Field of the Invention

The present invention relates to an aqueous resin composition useful as a coating on various substrates such as wood, metals, and molded resin products; a binder for paints and printing inks; a coating material; and an adhesive. The present invention also relates to an aqueous resin composition which, when dried, can form a tough and highly water resistant film.

2. Description of the Related Art

In the field of coating formation, a switch from emulsions in organic solvents to aqueous emulsions is strongly desired from the points of view of environmental hygiene and savings in resources. However, aqueous emulsions are not fully satisfactory in the water resistance, toughness, and adhesive strength of the resulting coating. A common practice for improving these properties is to introduce a functional group into an aqueous emulsion so that a crosslinked coating is formed. As an aqueous emulsion for formation of the crosslinked coating, a one-pack emulsion comprising a mixture of a curing agent and a polymer is demanded from the aspects of applicability and workability.

To fulfill this demand, U.S. Pat. No. 3,345,336 (Japanese Patent Publication No. 20053/71) discloses the crosslinking of a carbonyl group-containing polymer emulsion with a polyhydrazide compound. An aqueous emulsion used in this method is a one-pack emulsion. After the emulsion is applied for coating, water in the emulsion dries, whereupon the hydrazide groups and the carbonyl groups crosslink as a result of dehydration condensation to form a film. The polyhydrazide compound used here refers to a compound having at least two or more hydrazide groups. Examples of this compound are dihydrazides of an aromatic dicarboxylic acid such as phthalic acid, isophthalic acid, or terephthalic acid. Preferred examples are dihydrazides of an aliphatic saturated dicarboxylic acid having 2 to 10 carbon atoms, such as oxalic acid or sebacic acid. Particularly preferred examples are dihydrazides of adipic acid.

Various improvements have subsequently been made in one-pack crosslinkable aqueous emulsions containing polyhydrazides. Such improvements are described in Deutsche Offenlegungsschrift 2819092 (Japanese Unexamined Patent Publication No. 144432/79), Deutsche Offenlegungsschrift 2803258 (Japanese Unexamined Patent Publication No. 110248/79), Japanese Unexamined Patent Publication No. 3850/82, Japanese Unexamined Patent Publication No. 3857/82, Japanese Unexamined Patent Publication No. 96643/83, Japanese Unexamined Patent Publication No. 104902/83, Japanese Unexamined Patent Publication No. 38468/85, Japanese Unexamined Patent Publication No. 25163/87, Japanese Unexamined Patent Publication No. 62853/87, Deutsche Offenlegungsschrift 3720860 (Japanese Unexamined Patent Publication No. 20256/89), Japanese Unexamined Patent Publication No. 234416/89, Japanese Unexamined Patent Publication No. 68669/91, Japanese Unexamined Patent Publication No. 227947/92 (Deutsche Offenlegungsschrift 4016056), Japanese Unexamined Patent Publication No. 249587/92, and WO 96/01252.

Most of these one-pack crosslinkable aqueous emulsions use dihydrazides of aliphatic dicarboxylic acids as polyhydrazide compounds, and often use adipic acid dihydrazide preferably. Adipic acid dihydrazide functions as an effective crosslinking agent, but its solubility in water is insufficient, resulting in insufficient crosslinking. Consequently, the resulting coating is not fully water resistant.

One-pack crosslinkable aqueous emulsions using polyhydrazide compounds having three or more functional groups are also exemplified in some of the previously quoted prior art publications. Japanese Patent Publication No. 6861/86 describes a tri- or tetrahydrazide of pyromellitic acid, and a tri- or tetrahydrazide of nitrilotriacetic acid. Japanese Unexamined Patent Publication No. 38468/85, Deutsche Offenlegungsschrift 3720860, and Deutsche Offenlegungsschrift 4016056 describe pentane-1,3,5-tricarboxylic acid trihydrazides, hexene-4-1,2,6-tricarboxylic acid trihydrazides, and 3-cyanopentane-1,3,5-tricarboxylic acid trihydrazides.

The use of a hydrazide compound with three or more functional groups can increase the crosslinking density, and is thus expected to enhance the water resistance of a crosslinked coating. However, this does not mean that the higher the functionality of the hydrazide compound, the better outcome is obtained. An excessively high functionality means more hydrazide groups which cannot take part in crosslinking for reasons such as steric hindrance. As a result, the water resistance of the coating declines. Japanese Unexamined Patent Publication No. 234416/89 describes the use of a polyhydrazide formed by polymerizing two or more hydrazine compounds. When such a polyhydrazide is used, this polymeric hydrazide is slightly soluble in water, and cannot be fully dispersed in an aqueous emulsion. This poses difficulty in performing sufficient crosslinking. Japanese Unexamined Patent Publication No. 80619/94 describes a 1,2,3,4-butanetetracarboxylic acid hydrazide as an adsorbent of formaldehyde. This hydrazide is also sparingly soluble in water, and a coating of an emulsion formed by using it as a curing agent is poor in water resistance.

As described above, the use of a conventional aqueous resin composition containing a curing agent and a carbonyl compound still has posed difficulty in forming a crosslinked film having excellent properties such as water resistance and adhesion to a substrate.

It is an object of the present invention to provide a novel aqueous resin composition which has resolved the problems with the earlier technologies. That is, the object of this invention is to provide an aqueous resin composition containing fully dispersed components, and having high storage stability. It is another object of the present invention to provide an aqueous resin composition which, when dried, can form a film excellent in film intactness, transparency, whitening after water immersion, and adhesion after water immersion.

DISCLOSURE OF THE INVENTION

To attain these objects, the inventors of the present invention have conducted extensive studies, including stereostructures of hydrazide compounds. As a result, they have found that an aqueous resin composition having sufficient storage stability can be prepared by the use of a trifunctional hydrazide compound having a specific structure. They have also found that a film excellent in all of film intactness, transparency, whitening after water immersion, and adhesion after water immersion can be formed by drying this aqueous resin composition. The present invention has been presented on the basis of these findings.

That is, the present invention provides an aqueous resin composition containing (A) a copolymer of (a) a monomer having one or more aldehyde groups or ketone groups, and a radical polymerizable unsaturated bond, in a molecule, with (b) a monomer having a radical polymerizable unsaturated bond copolymerizable with the monomer (a); (B) a hydrazine compound of the following formula (1)

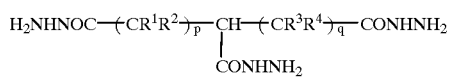

where $R^1$, $R^2$, $R^3$ and $R^4$ independently represent a hydrogen atom, or a hydroxyl group, p denotes an integer of 0 to 3, and q denotes an integer of 2 to 8, provided that the relationships $p+q \leq 8$ and $p<q$ are satisfied; and an aqueous medium.

The present invention also provides a polymer crosslinking agent for use in a crosslinking reaction of (A) a copolymer of (a) a monomer having one or more aldehyde groups or ketone groups, and a radical polymerizable unsaturated bond, in a molecule, with (b) a monomer having a radical polymerizable unsaturated bond copolymerizable with the monomer (a), the polymer crosslinking agent containing (B) a hydrazine compound of the above-mentioned formula (1).

The present invention also provides a coating containing (A) a copolymer of (a) a monomer having one or more aldehyde groups or ketone groups, and a radical polymerizable unsaturated bond, in a molecule, with (b) a monomer having a radical polymerizable unsaturated bond copolymerizable with the monomer (a), the coating having a structure crosslinked with a structural unit of the following formula (2)

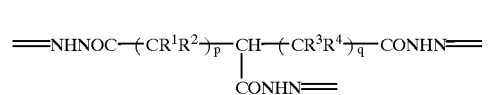

where $R^1$, $R^2$, $R^3$ and $R^4$ independently represent a hydrogen atom, or a hydroxyl group, p denotes an integer of 0 to 3, and q denotes an integer of 2 to 8, provided that the relationships $p+q \leq 8$ and $p<q$ are satisfied.

According to a preferred embodiment of the present invention, an aqueous dispersed resin obtained by emulsion polymerizing the monomer (a) and the monomer (b) in an aqueous medium is used as the copolymer (A). As the monomer (a), it is preferred to use a monomer selected from the group consisting of diacetone (meth)acrylamide, (meth) acrolein, and acetoacetoxyethyl (meth)acrylate. As the hydrazine compound (B) expressed by the formula (1), it is preferred to use butanetricarbohydrazide.

According to another preferred embodiment of the present invention, the aqueous resin composition is of the one-pack type.

DESCRIPTION OF PREFERRED EMBODIMENTS

The components and actions of the aqueous resin composition according to the present invention will now be described in detail below.

Copolymer (A)

The copolymer (A) is a copolymer formed by copolymerizing (a) a monomer having one or more aldehyde groups or ketone groups, and a radical polymerizable unsaturated bond, in a molecule, with (b) a monomer having a radical polymerizable unsaturated bond copolymerizable with the monomer (a).

Examples of the monomer (a) having one or more aldehyde groups or ketone groups, and a radical polymerizable unsaturated bond, in a molecule are (meth)acrolein, diacetone (meth)acrylamide, formylstyrol, vinylmethylketone, vinylethylketone, diacetone (meth)acrylate, and acetoacetoxyethyl (meth)acrylate. Of these compounds, diacetone (meth)acrylamide, (meth)acrolein, and acetoacetoxyethyl (meth)acrylate are particularly preferred. In the specification, "(meth)acrylic acid" refers to acrylic acid or methacrylic acid, and a similar expression "(meth)acrylic acid derivative" refers to an acrylic acid derivative or a methacrylic acid derivative.

The content of the monomer (a) in the copolymer is preferably 4 to 40% by weight, and more preferably 5 to 20% by weight. If this content is less than 4% by weight, the content of the carbonyl group in the copolymer becomes low. Thus, the tendency arises that the crosslinking density for crosslinking of the copolymer and the hydrazine derivative decreases, making it difficult to obtain a full improvement in the properties of the resulting film, such as water resistance. If the content of the monomer (a) is greater than 40% by weight, the content of the monomer (b) relatively decreases, resulting in the tendency that various properties required for the intended uses are difficult to obtain.

The monomer (b) having a radical polymerizable unsaturated bond copolymerizable with the monomer (a) is not restricted in its structure, as long as it can be copolymerized with the monomer (a). Examples of the monomer (b) are aromatic vinyl compounds such as styrene, α-methylstyrene, and vinylnaphthalene; cycloalkyl or alkyl (meth)acrylates having 1 to 18 carbon atoms, such as methyl (meth)acrylate, ethyl (meth)acrylate, butyl (meth)acrylate, cyclohexyl (meth)acrylate, 2-ethylhexyl (meth)acrylate, and stearyl (meth)acrylate; α,β-unsaturated carboxylic acids such as (meth)acrylic acid; α,β-unsaturated dicarboxylic acids such as itaconic acid, maleic acid, and 2-methyleneglutaric acid; (meth)acrylates having a hydroxyl group at the end, such as 2-hydroxyethyl (meth)acrylate, and 4-hydroxybutyl (meth)acrylate; vinyl esters such as vinyl acetate, and vinyl propionate; and (meth)acrylamide, N-alkylolacrylamides, (meth)acrylonitrile, and vinyl halides. If necessary, there can be used a crosslinkable monomer having two or more radical polymerizable double bonds in a molecule, such as allyl (meth)acrylate, ethylene glycol di(meth)acrylate, or trimethylolpropane triacrylate. The content of the monomer (b) in the copolymer is preferably 96 to 60% by weight, and more preferably 95 to 80% by weight.

The monomer (a) and the monomer (b) may each be one of the monomers used alone, or two or more of the monomers used in combination. When two or more of the monomers are used in combination as the monomer (b), it is preferred to use a copolymer of one or more rigid polymerizable monomers whose homopolymers have a glass transition temperature of 40° C. or above, with one or more flexible polymerizable monomers whose homopolymers have a glass transition temperature of 25° C. or below. The rigid polymerizable monomer includes, for example, methyl methacrylate, ethyl methacrylate, and styrene. The flexible polymerizable monomer includes, for example, butyl acrylate, and 2-ethylhexyl acrylate.

The glass transition temperature of the copolymer (A) can be adjusted suitably in accordance with uses of the aqueous resin composition. It is particularly preferred that the calculated value of the glass transition temperature of the copolymer (A), calculated from the following equation, be within the range of from −60° C. to 60° C.:

$1/Tg = W_a/Tg_a + W_b/Tg_b$ where Tg denotes the calculated value (K) of the glass transition temperature of the copolymer, $Tg_a$ and $Tg_b$ denote the glass transition temperatures (K) of the homopolymers of the monomer (a) and the monomer (b), respectively, and $W_a$ and $W_b$ denote the weight fractions of the monomer (a) and the monomer (b), respectively.

The aqueous medium used in the aqueous resin composition of the present invention may be an aqueous solution or an aqueous dispersion. Thus, it is preferred that the copolymer (A), the essential component of the aqueous resin composition, is also prepared as an aqueous solution or an aqueous dispersion, and the remaining components are added to and mixed with the solution or dispersion.

In preparing an aqueous solution of the copolymer (A), the solvent used may be water, or a mixture of water and an organic solvent soluble in water. Examples of the organic solvent soluble in water are alcohols such as methanol, ethanol, isopropyl alcohol; ketones such as acetone, and methyl ethyl ketone; glycol ethers such as methyl cellosolve, and butyl cellosolve; and ethers such as tetrahydrofuran, and 1,4-dioxane.

To prepare an aqueous dispersion of the copolymer (A), on the other hand, emulsion polymerization, suspension polymerization, or a method of solution polymerization in an organic solvent, followed by adding an aqueous medium for phase transition, may be employed. Particularly preferred is the customary method which comprises emulsion polymerization in an aqueous medium in the presence of a polymerization initiator and a surface active agent.

Examples of the polymerization initiator are persulfates such as potassium persulfate, and ammonium persulfate; peroxides such as hydrogen peroxide, benzoyl peroxide, and t-butyl hydroperoxide; azo derived polymerization initiators such as azobisisobutyronitrile; and redox type polymerization initiators comprising combinations of these polymerization initiators with reducing agents such as ascorbic acid. These polymerization initiators may be used alone, or as a combination of two or more, where necessary. The amount of the polymerization initiator used is preferably 0.01 to 10 parts by weight, more preferably 0.1 to 2 parts by weight, per 100 parts by weight of the polymerizable monomer.

Examples of the surface active agent are anionic surface active agents such as alkylbenzenesulfonates, higher alcohol sulfuric ester salts, and polyoxyethylene alkylsulfonates; nonionic surface active agents such as polyoxyethylene alkyl ethers, and polyoxyethylene alkylphenol ethers; and cationic surface active agents. As the surface active agent, there can be used a reactive surface active agent having a radical polymerizable unsaturated bond in a molecule. Examples of the reactive surface active agent are sodium alkylallylsulfosuccinate (Eleminol JS-2, SANYO CHEMICAL INDUSTRIES, LTD.), sodium methacryloyloxypolyoxyalkylene-sulfate (Eleminol RS-30, SANYO CHEMICAL INDUSTRIES, LTD.), polyoxyethylene alkylallylphenol ether (Aquarone RN series, Dai-ichi Kogyo Seiyaku Co., Ltd.), and polyoxyethylene alkylallylphenol ether sulfuric ester salt (Aquarone HS series, Dai-ichi Kogyo Seiyaku Co., Ltd.). These surface active agents may be used alone, or as a combination of two or more. The surface active agent is used in an amount of, usually, 0.1 to 10 parts by weight, preferably 1 to 5 parts by weight, per 100 parts by weight of the radical polymerizable unsaturated compound.

During polymerization, a water soluble polymeric compound, such as polyvinyl alcohol or hydroxyethyl cellulose, may be added as a protective colloid in addition to the polymerization initiator and the surface active agent. Depending on the type of the emulsifying agent, emulsifying power may decline in an acidic region, when an unsaturated carboxylic acid monomer such as acrylic acid is to be copolymerized. In this case, it is preferred that polymerization is performed with the addition of an alkali, such as aqueous ammonia, to the polymerization reaction system. The temperature conditions during emulsion polymerization are not restricted, but the temperature is usually 40 to 95° C., preferably 60 to 90° C.

Hydrazine Compound (B)

The hydrazine compound (B), an essential component of the aqueous resin composition of the present invention, is a compound having three hydrazide groups in a molecule, as shown in the general formula (1). Being trifunctional, the hydrazine compound (B) is capable of three-dimensional crosslinking, and can increase the crosslinking density in comparison with a conventional bifunctional hydrazide such as adipic acid dihydrazide. Therefore, when the hydrazide compound (B) of the general formula (1) is used as a crosslinking agent for the copolymer (A), the water resistance of the resulting coating can be enhanced marvelously. In the hydrazide compound (B) of the general formula (1), the three hydrazide groups do not bind to the adjacent carbon atom, so that steric hindrance is minimal. Thus, the crosslinking reaction proceeds easily, and a sufficient crosslinking effect is obtained. Compared with an aromatic hydrazide, such as trimellitic acid hydrazide, the hydrazide compound (B) has a high degree of freedom of the molecule because of its structure. Thus, it faces minimal steric hindrance, giving a sufficient crosslinking effect. Furthermore, compared with a tetrafunctional hydrazine compound such as pyromellitic acid tetrahydrazide or butanetetracarboxylic acid tetrahydrazide, or a polyhydrazine such as hydrazine-modified poly(meth)acrylic acid, the hydrazide compound (B) has the advantage of very high solubility in water.

Examples of the hydrazine compound (B) according to the present invention are aliphatic tricarboxylic acid trihydrazides such as 1,2,4-butanetricarbohydrazide, 1,1,4-butanetricarbohydrazide, 1,2,5-pentanetricarbohydrazide, 1,3,6-hexanetricarbohydrazide, and 1,3,7-heptanetricarbohydrazide. Those having a hydroxyl group include, for example, 1-hydroxy-1,2,4-butanetricarbohydrazide. Preferred examples are 1,2,4-butanetricarbohydrazide, and 1,2,5-pentanetricarbohydrazide, and a particularly preferred example is 1,2,4-butanetricarbohydrazide.

The amount of the hydrazine compound (B) used is desirably such that the amount of the hydrazino groups in the hydrazine compound (B) is usually 0.1 to 5 mole equivalents, particularly 0.5 to 2 mole equivalents, per mole equivalent of the carbonyl groups in the copolymer (A).

Other Arbitrary Components

The aqueous resin composition of the present invention may contain various components, depending on the intended uses, in addition to the copolymer (A), the hydrazine compound (B) and the aqueous medium. For instance, an alkyl mercaptan can be added as a molecular weight modifier during polymerization in order to adjust the molecular weight of the copolymer. Furthermore, inorganic fillers, such as film-forming auxiliaries, antifoaming agents, rust-preventing agents, thickening agents, preservatives, ultraviolet absorbers, light stabilizers, pigments, and silica, may be incorporated. These components may be added in such amounts as not to impair the desired effects of the present invention. The sequence of their addition is not restricted.

Actions of the Aqueous Resin Composition

The aqueous resin composition of the present invention prepared by mixing the above-described components undergoes a crosslinking reaction between the carbonyl group of the copolymer (A) and the hydrazino group of the hydrazine compound (B), when this composition dries at room temperature. That is, this composition has room temperature crosslinking properties. As a result of this reaction, a crosslink is formed between the carbonyl group and the hydrazino group, whereby a tough, highly water resistant film is produced. Since the present invention particularly uses the hydrazine compound (B) having three hydrazino groups in the molecule, the copolymer (A) is crosslinked with a structural unit expressed by the aforementioned formula (2). Thus, in comparison with a typical conventional product using a hydrazine compound having two hydrazino groups in the molecule, the composition of the present invention can form a high density, firmly crosslinked film.

The crosslinking reaction between the carbonyl group and the hydrazino group is a dehydration reaction. While the aqueous resin composition is containing water, therefore, water works as a crosslinking inhibitor, and the reaction does not proceed. Hence, the aqueous resin composition of the present invention has full storage stability for a long term, although it is of the one-pack type.

EXAMPLES

The present invention will be described in further detail by way of Production Examples and Examples to be offered below. The materials, proportions, and operating conditions indicated in the following Production Examples and Examples may be modified suitably, unless such modifications depart from the spirit of the invention. Thus, the scope of the invention is not restricted to these concrete examples.

Production Examples 1 to 3 and 5 to 8 show methods for producing aqueous dispersions of the copolymer (A), while Production Example 4 shows methods for producing an aqueous solution of the hydrazine compound (B) and an aqueous solution of a control hydrazine compound. Examples show methods for producing the aqueous resin compositions of the present invention using these components, and the results of tests on their properties, along with Comparative Examples. The "parts" and "%" described in the Production Examples and the Examples refer to "parts by weight" and "% by weight", respectively, unless otherwise specified.

Production Example 1

A reactor equipped with a stirrer, a reflux condenser, a thermometer, and a dropping funnel was charged with ammonium persulfate (1 part), sodium dodecylbenzenesulfonate (10 parts), and water (90 parts), and the mixture was heated at 85° C. in an atmosphere of nitrogen. An emulsion formed by emulsifying 2-ethylhexyl acrylate (120 parts), styrene (60 parts), diacetone acrylamide (20 parts), sodium dodecylbenzenesulfonate (10 parts), and water (90 parts) with a homomixer was added dropwise over 2 hours. Simultaneously with, 30 minutes after, 1 hour after, and 1 hour and 30 minutes after the start of dropwise addition of the emulsion, an aqueous solutionof ammoniumpersulfate (1 part) inwater (20 parts), divided into four equal portions, was added dropwise. After completion of the dropwise addition of the emulsion, the reaction was performed at 85° C. for 3 hours. Then, the reaction mixture was cooled, and 28% aqueous ammonia was added dropwise to adjust the pH to 8. A milk-white aqueous dispersion with a solids content of 50.6% was obtained.

Production Example 2

A reactor equipped with a stirrer, a reflux condenser, a thermometer, and a dropping funnel was charged with potassium persulfate (0.36 part), an anionic emulsifying agent (Newcall 707SN, a product of Nippon Nyukazai; 6.9 parts), and water (94 parts), and the mixture was heated at 85° C. in an atmosphere of nitrogen. An emulsion formed by emulsifying a mixture of methyl methacrylate (78 parts), butyl acrylate (45 parts), 2-ethylhexyl acrylate (30 parts), styrene (29 parts), acrylic acid (1 part), diacetone acrylamide (9.6 parts), the above anionic emulsifying agent (9.3 parts), and water (10 parts) by means of a homomixer was added dropwise over 3 hours. After completion of the dropwise addition of the emulsion, an aqueous solution of potassium persulfate (0.21 part) in water (2 parts) was added as a catalyst. The mixture was further reacted at 85° C. for 3 hours. The resulting reaction mixture was cooled, and 28% aqueous ammonia was added dropwise to adjust the pH to 8. A milk-white aqueous dispersion with a solids content of 45.7% was obtained.

Production Example 3

A reactor equipped with a stirrer, a reflux condenser, a thermometer, and a dropping funnel was charged with ammonium persulfate (1.8 parts), an anionic reactive emulsifying agent (a 25% aqueous solution of Aquarone HS-1025, a product of Dai-ichi Kogyo Seiyaku Co., Ltd.; 12.0 parts), and water (210.0 parts), and the mixture was heated at 75° C. in an atmosphere of nitrogen. An emulsion formed by emulsifying a mixture of ethyl acrylate (85.0 parts), 2-hydroxyethyl acrylate (10.0 parts), styrene (77.0 parts), methacrylic acid (8.0 parts), diacetone acrylamide (20.0 parts), the above anionic reactive emulsifying agent (24.0 parts), lauryl mercaptan (2.0 parts), and water (72 parts) by means of a homomixer was added dropwise over 3 hours. 30 minutes after completion of the dropwise addition of the emulsion, 28% aqueous ammonia (6.4 parts) was added, and an aqueous solution of ammonium persulfate (0.2 part) in water (2 parts) was added as a catalyst. The mixture was reacted at 80° C. for 3 hours. The resulting reaction mixture was cooled to obtain a milk-white aqueous dispersion with a solids content of 39.8%.

Production Example 4

The hydrazine compound (B), 1,2,4-butanetricarbohydrazide (BTCH), (10 parts) was mixed with water (90 parts) at room temperature. The 1,2,4-butanetricarbohydrazide easily dissolved in water to form an aqueous solution.

As a control hydrazine compound, adipic acid dihydrazide (ADH) (10 parts) was mixed with water (90 parts) at room temperature. The adipic acid dihydrazide did not easily dissolve in water. Thus, the mixture was heated to prepare an aqueous solution.

Similarly, a high molecular polyhydrazide (APA-H, produced by Otsuka Kagaku; 10 parts) as a control hydrazine compound was mixed with water (90 parts). The mixture did not dissolve when heated with stirring.

Production Example 5

A reactor equipped with a stirrer, a reflux condenser, a thermometer, and a dropping funnel was charged with ammonium persulfate (2 parts), an anionic reactive emulsifying agent (a 25% aqueous solution of Aquarone HS-1025, a product of Dai-ichi Kogyo Seiyaku Co., Ltd.; 8.0 parts), 28% aqueous ammonia (2.0 parts), and water (200.0 parts), and the mixture was heated at 75° C. in an atmosphere of nitrogen. An emulsion formed by mechanically emulsifying a mixture of butyl acrylate (180.0 parts), 2-hydroxyethyl methacrylate (16.0 parts), styrene (150.0 parts), acrylic acid (16.0 parts), diacetone acrylamide (30.0 parts), the above anionic reactive emulsifying agent (32.0 parts), lauryl mercaptan (8.0 parts), and water (170 parts) by means of a homomixer was added dropwise over 3 hours. 30 minutes after completion of the dropwise addition of the preemulsion, 28% aqueous ammonia (2.0 parts) and ammonium persulfate (0.3 part) were added. After addition of the catalyst, the mixture was reacted at 80° C. for 3 hours. Upon completion of the reaction, 28% aqueous ammonia (6.0 parts) was further added. The resulting emulsion was cooled to obtain a milk-white aqueous dispersion with a solids content of 51.1%.

Production Example 6

A reactor equipped with a stirrer, a reflux condenser, a thermometer, and a dropping funnel was charged with ammonium persulfate (2.0 parts), an anionic reactive emulsifying agent (a 25% aqueous solution of Aquarone HS-1025, a product of Dai-ichi Kogyo Seiyaku Co., Ltd.; 8.0 parts), 28% aqueous ammonia (2.0 parts), and water (290.0 parts), and the mixture was heated at 75° C. in an atmosphere of nitrogen. An emulsion formed by mechanically emulsifying a mixture of butyl acrylate (120.0 parts), 2-ethylhexyl acrylate (60 parts), styrene (60.0 parts), methylmethacrylate (130.0 parts), acrylic acid (8.0 parts), diacetone acrylamide (30.0 parts), the above anionic reactive emulsifying agent (32.0 parts), and water (170 parts) by means of a homomixer was added dropwise over 3 hours. 30 minutes after completion of the dropwise addition of the preemulsion, 28% aqueous ammonia (2.0 parts) and ammonium persulfate (0.3 part) were added. After addition of the catalyst, the mixture was further reacted at 80° C. for 3 hours. Upon completion of the reaction, 28% aqueous ammonia (2.0 parts) was further added. The resulting emulsion was cooled to obtain a milk-white aqueous dispersion with a solids content of 45.5%.

Production Example 7

An aqueous dispersed resin was obtained in the same way as in Production Example 6, except that lauryl mercaptan (1.0 part) was added as a chain transfer agent. The solids content of the resulting aqueous dispersed resin was 45.9%.

Production Example 8

An aqueous dispersed resin was obtained in the same way as in Production Example 6, except that lauryl mercaptan (8.0 parts) was added as a chain transfer agent. The solids content of the resulting aqueous dispersed resin was 45.6%.

Example 1

An aqueous resin composition was obtained by mixing, with stirring, each of the aqueous dispersions of Production Examples 1 to 3 with the aqueous solution of Production Example 4 so that the number of moles of the amino groups of the hydrazine compound would take a predetermined value based on the carbonyl groups of the copolymer (A). On this occasion, the combination of the copolymer (A) and the hydrazine compound, and their proportions used were varied as described in Table 1 (to be presented later on), to obtain 15 aqueous resin compositions. For the aqueous resin compositions 5, 10 and 15, a proper amount of water was added in place of the hydrazine compound.

Each of the aqueous resin compositions prepared was stored for 1 month in a thermostatic chamber at 50° C. Then, the state of the composition was visually judged by the following criteria to evaluate its storage stability:

○: Equal to the initial state, and showed no agglomeration.

Δ: Showed slight agglomeration, or increased in viscosity.

X: The composition separated or gelled.

Each of the aqueous resin compositions prepared was coated by means of a bar coater (#16) onto a polyethylene terephthalate film substrate (100 μm thick) pretreated for enhancing adhesion. The coated substrate was dried for 1 week at room temperature to prepare a test piece having a 10 μm film. The film of each test piece was visually judged by the following criteria to evaluate the appearance of the coating:

○: The coating was uniform.

X: Cracking occurred in the coating.

The haze of the test piece was measured with a haze meter (a product of Nippon Denshoku Kogyo) to evaluate the transparency.

The test piece was immersed in distilled water at ordinary temperature. A change (ΔH) in the haze 7 days later was measured with a haze meter to evaluate the whitening after water immersion.

The test piece was immersed in distilled water at ordinary temperature. The state of the film 7 days later was visually judged by the following criteria to evaluate the adhesion after water immersion:

○: The film adhered to the substrate without peeling off.

X: Part or all of the film peeled off the substrate.

The results of these tests are shown in Table 1.

TABLE 1

| Composition No. | Aqueous dispersed resin | Hydrazine compound* | $NH_2/C{=}O$ (mol/mol) | Storage stability | Coating appearance | Transparency | Whitening after water immersion | Adhesion after water immersion |
|---|---|---|---|---|---|---|---|---|
| 1 (present invention) | Production Ex. 1 | B | 0.60 | ○ | ○ | 2.2 | 14.5 | ○ |
| 2 (present invention) | Production Ex. 1 | B | 0.90 | ○ | ○ | 2.4 | 10.4 | ○ |
| 3 | Production Ex. 1 | A | 0.60 | x | ○ | 2.4 | Completely whitened | ○ |
| 4 | Production Ex. 1 | A | 0.90 | x | ○ | 2.1 | Completely whitened | ○ |
| 5 | Production Ex. 1 | None | 0.00 | ○ | ○ | 2.2 | Peeled off | Peeled off |
| 6 (present | Production | B | 0.60 | ○ | ○ | 2.1 | 8.9 | ○ |

TABLE 1-continued

| Composition No. | Aqueous dispersed resin | Hydrazine compound* | NH$_2$/C=O (mol/mol) | Storage stability | Coating appearance | Transparency | Whitening after water immersion | Adhesion after water immersion |
|---|---|---|---|---|---|---|---|---|
| invention) | Ex. 2 | | | | | | | |
| 7 (present invention) | Production Ex. 2 | B | 0.90 | ○ | ○ | 1.8 | 6.0 | ○ |
| 8 | Production Ex. 2 | A | 0.60 | ○ | ○ | 2.2 | 62.4 | ○ |
| 9 | Production Ex. 2 | A | 0.90 | Δ | ○ | 2.1 | 60.1 | ○ |
| 10 | Production Ex. 2 | None | 0.00 | ○ | ○ | 1.3 | Completely whitened | ○ |
| 11 (present invention) | Production Ex. 3 | B | 1.00 | ○ | ○ | 1.3 | 6.4 | ○ |
| 12 (present invention) | Production Ex. 3 | B | 1.50 | ○ | ○ | 1.4 | 2.0 | ○ |
| 13 | Production Ex. 3 | A | 1.00 | ○ | ○ | 1.3 | Peeled off | Peeled off |
| 14 | Production Ex. 3 | A | 1.50 | ○ | ○ | 1.4 | 42.3 | ○ |
| 15 | Production Ex. 3 | None | 0.00 | ○ | ○ | 1.3 | Peeled off | Peeled off |

*Hydrazine compound A: Adipic acid dihydrazide
Hydrazine compound B: 1,2,4-butanetricarbohydrazide The results in Table 1 show that the aqueous resin compositions of the present invention containing the copolymer (A) having aldehyde groups or ketone groups and the hydrazine compound (B) having three hydrazino groups in the molecule have high storage stability, and are excellent in all of the coating appearance, transparency, whitening after water immersion, and adhesion after water immersion, of the resulting film (compositions 1, 2, 6, 7, 11, 12). The aqueous resin compositions containing the hydrazine compound having two hydrazino groups in the molecule have low storage stability, and are poor in the whitening after water immersion, and adhesion after water immersion, of the resulting film (compositions 3, 4, 8, 9, 13, 14). The aqueous resin compositions containing no hydrazine compound were poor in the transparency, whitening after water immersion, and adhesion after water immersion, of the resulting film (compositions 5, 10, 15). These results demonstrate that the aqueous resin composition according to the present invention is an excellent composition satisfactory in both of the properties of the composition and the properties of the film.

Example 2

Six aqueous resin compositions shown in Table 2 were obtained by mixing, with stirring, the aqueous dispersion of Production Example 5 with an aqueous solution of a predetermined hydrazine compound so that the number of moles of the amino groups of the hydrazine compound would take a predetermined value based on the carbonyl groups of the copolymer (A). For the aqueous resin composition 21, a proper amount of water was added in place of the hydrazine compound.

For each of the aqueous compositions prepared, the coating appearance, transparency, whitening after water immersion, and adhesion after water immersion, of the resulting film were evaluated by the same methods as described in Example 1. The whitening after water immersion was measured after one day of immersion, as well as 7 days of immersion, in distilled water at ordinary temperature. The results are summarized in Table 2.

TABLE 2

| Composition No. | Hydrazine compound* | | | NH$_2$/C=O (mol/mol) | Coating appearance | Transparency | Whitening after water immersion | | Adhesion after water immersion |
| | Type | Number of functional groups | Solubility in water | | | | 1 day later | 7 days later | |
|---|---|---|---|---|---|---|---|---|---|
| 21 | None | — | — | 0.00 | ○ | 1.3 | Peeled off | Peeled off | Peeled off |
| 22 | A | 2 | 5.8 | 1.00 | ○ | 1.4 | 5.2 | Peeled off | Peeled off |
| 23 (present invention) | B | 3 | 20 | 1.00 | ○ | 1.3 | 3.1 | 10.9 | ○ |
| 24 | C | 3 | 0.3 | 1.00 | Δ | 2.8 | 47.4 | 49.9 | ○ |
| 25 | D | 3 | 2.7 | 1.00 | Δ~○ | 1.4 | 74.4 | 89.1 | ○ |
| 26 | E | 4 | 0.1 | 1.00 | Δ | 9.3 | 71.5 | 86.2 | ○ |

*Hydrazine compound A: Adipic acid dihydrazide
Hydrazine compound B: 1,2,4-butanetricarbohydrazide
Hydrazine compound C: 1,3,5-cyclohexanetricarbohydrazide
Hydrazine compound D: 1,3,5-pentanetricarbohydrazide
Hydrazine compound E: 1,2,3,4-butanetetracarbohydrazide The results in Table 2 show that 1,2,4-butanetricarbohydrazide, the hydrazine compound (B) of the present invention having a specific structure, has higher solubility in water than the other hydrazine compounds. The results also show that a coating formed from the aqueous resin composition of the present invention containing the copolymer (A) having aldehyde groups or ketone groups and the hydrazine compound (B) of the present invention having a specific structure is superior in the coating appearance, transparency, whitening after water immersion, and adhesion after water immersion (composition 23). On the other hand, a coating formed from the aqueous resin composition containing a hydrazine compound containing two hydrazino groups in the molecule was inferior in the whitening after water immersion, and adhesion after water immersion (composition 22). A coating formed from the aqueous resin composition containing a hydrazine compound having 3 hydrazino groups in the molecule, but not satisfying the specific structure of the present invention, and a coating formed from the aqueous resin composition containing a hydrazine compound having 4 hydrazino groups in the molecule were poor in the coating appearance and whitening after water immersion (compositions 24, 25, 26). The aqueous resin composition containing no hydrazine compound was inferior in the whitening after water immersion, and adhesion after water immersion (composition 21). These results demonstrate that the properties of a coating formed from the aqueous resin composition of the present invention are satisfactory.

Example 3

Six aqueous resin compositions shown in Table 3 were obtained by mixing, with stirring, the aqueous dispersion of each of Production Examples 6 to 8 with the aqueous solution of Production Example 4 so that the number of moles of the amino groups of the hydrazine compound would take a predetermined value based on the carbonyl groups of the copolymer (A).

For each of the aqueous compositions prepared, the coating appearance, transparency, whitening after water immersion (1 day later and 7 days later), and adhesion after water immersion, of the resulting film were evaluated by the same methods as described in Example 1. The water absorption of the film was also evaluated in the following manner: Each of the aqueous dispersed resins was placed in a Teflon container, and dried for 5 days at 35° C. to prepare a 1 mm thick resin film. This film was cut to a size of 25 mm×25 mm to serve as a specimen. The specimen was immersed in distilled water at ordinary temperature, and measured for water absorption which was calculated from the equation indicated below. The results are summarized in Table 3.

Water absorption (%)={(weight after immersion−weight before immersion)/weight before immersion}×100

TABLE 3

| Composition No. | Aqueous dispersed resin | Hydrazine compound* | $NH_2/C{=}O$ (mol/mol) | Coating appearance | Transparency | Whitening after water immersion 1 day later | Whitening after water immersion 7 days later | Adhesion after water immersion | Water absorption (%) 1 day later | Water absorption (%) 7 days later |
|---|---|---|---|---|---|---|---|---|---|---|
| 31 (present invention) | Production Example 6 | B | 0.80 | ○ | 1.5 | 1.8 | 2.1 | ○ | 17.2 | 17.2 |
| 32 | Production Example 6 | A | 0.80 | ○ | 1.4 | 2.9 | 3.6 | ○ | 22.5 | 32.5 |
| 33 (present invention) | Production Example 7 | B | 0.80 | ○ | 1.4 | 1.8 | 3.2 | ○ | 18.1 | 16.2 |
| 34 | Production Example 7 | A | 0.80 | ○ | 1.4 | 2.1 | 3.3 | ○ | 22.7 | 25.4 |
| 35 (present invention) | Production Example 8 | B | 0.80 | ○ | 1.6 | 3.5 | 23.6 | ○ | 28.1 | 41.9 |
| 36 | Production Example 8 | A | 0.80 | ○ | 1.4 | 21.5 | 49.5 | ○ | 53.5 | 62.5 |

*Hydrazine compound A: Adipic acid dihydrazide
Hydrazine compound B: 1,2,4-butanetricarbohydrazide The results in Table 3 show that the water absorption of a coating formed by the use of 1,2,4-butanetricarbohydrazide, the hydrazine compound (B) of the present invention having a specific structure, is smaller than that of a coating formed by the use of adipic acid dihydrazide. This finding demonstrates that the aqueous resin composition of the present invention has high water resistance.

As described above, the aqueous resin composition of the present invention has high storage stability, and when dried, can form a film excellent in film intactness, transparency, whitening after water immersion, and adhesion after water immersion. Moreover, the aqueous resin composition uses the highly water soluble hydrazine compound (B), which brings the advantage in production that it can be easily dissolved and mixed into an aqueous resin.

The aqueous resin composition of the present invention having the above-described features is useful as an aqueous resin for a coating on various substrates such as wood, metals, and molded resin products; a binder for paints and printing inks; a coating material; and an adhesive.

What is claimed is:

1. An aqueous resin composition containing (A) a copolymer of (a) a monomer having one or more aldehyde groups or ketone groups, and a radical polymerizable unsaturated bond, in a molecule, with (b) a monomer having a radical polymerizable unsaturated bond copolymerizable with the monomer (a); (B) a hydrazine compound of the following formula (1):

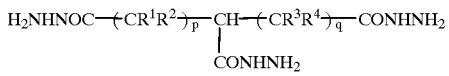

where $R^1$, $R^2$, $R^3$ and $R^4$ independently represent a hydrogen atom, or a hydroxyl group, p denotes 0 or an integer of 1 to 3, and q denotes an integer of 2 to 8, provided that the relationships $p+q \leqq 8$ and $p<q$ are satisfied; and an aqueous medium.

2. The aqueous resin composition of claim 1, wherein the monomer (a) is one or more compounds selected from the group consisting of (meth)acrolein, diacetone (meth) acrylamide, formylstyrol, vinylmethylketone, vinylethylketone, diacetone (meth)acrylate, and acetoacetoxyethyl (meth)acrylate.

3. The aqueous resin composition of claim 2, wherein the monomer (a) is one or more compounds selected from the group consisting of (meth)acrolein, diacetone (meth) acrylamide, and acetoacetoxyethyl (meth)acrylate.

4. The aqueous resin composition of claim 1, wherein the monomer (b) is one or more compounds selected from the group consisting of aromatic vinyl compounds, cycloalkyl or alkyl (meth)acrylates having 1 to 18 carbon atoms, α,β-unsaturated carboxylic acids, α,β-unsaturated dicarboxylic acids, (meth) acrylates having a hydroxyl group at the end, vinyl esters, (meth)acrylamide, N-alkylolacrylamides, (meth)acrylonitrile, vinyl halides, and allyl (meth)acrylate.

5. The aqueous resin composition of claim 4, wherein the monomer (b) is one or more compounds selected from the group consisting of styrene, α-methylstyrene, vinylnaphthalene, methyl (meth)acrylate, ethyl (meth) acrylate, butyl (meth)acrylate, cyclohexyl (meth)acrylate, 2-ethylhexyl (meth)acrylate, stearyl (meth)acrylate, (meth) acrylic acid, itaconic acid, maleic acid, 2-methyleneglutaric acid, 2-hydroxyethyl (meth)acrylate, 4-hydroxybutyl (meth) acrylate, vinyl acetate, vinyl propionate, (meth)acrylonitrile, allyl (meth)acrylate, ethylene glycol di(meth)acrylate, and trimethylolpropane triacrylate.

6. The aqueous resin composition of claim 1, wherein the monomer (b) is a combination of one or more rigid polymerizable monomers whose homopolymers have a glass transition temperature of 40° C. or above, and one or more flexible polymerizable monomers whose homopolymers have a glass transition temperature of 25° C. or below.

7. The aqueous resin composition of claim 1, wherein the copolymer (A) comprises 4 to 40% by weight of the monomer (a) and 96 to 60% by weight of the monomer (b).

8. The aqueous resin composition of claim 7, wherein the copolymer (A) comprises 5 to 20% by weight of the monomer (a) and 95 to 80% by weight of the monomer (b).

9. The aqueous resin composition of claim 1, wherein the copolymer (A) is an aqueous dispersed resin obtained by emulsion polymerizing the monomer (a) with the monomer (b) in an aqueous medium.

10. The aqueous resin composition of claim 1, wherein the hydrazine compound (B) is one or more compounds selected from the group consisting of 1,2,4-butanetricarbohydrazide, 1,1,4-butanetricarbohydrazide, 1,2,5-pentanetricarbohydrazide, 1,3,6-hexanetricarbohydrazide, 1,3,7-heptanetricarbohydrazide, and 1-hydroxy-1,2,4-butanetricarbohydrazide.

11. The aqueous resin composition of claim 1, wherein the hydrazine compound (B) is butanetricarbohydrazide.

12. The aqueous resin composition of claim 11, wherein the hydrazine compound (B) is 1,2,4-butanetricarbohydrazide.

13. The aqueous resin composition of claim 1, wherein the hydrazine compound (B) is contained in such an amount that the amount of the hydrazino groups in the hydrazine compound (B) is 0.1 to 5 mole equivalents per mole equivalent of the carbonyl groups in the copolymer (A).

14. The aqueous resin composition of claim 13, wherein the hydrazine compound (B) is contained in such an amount that the amount of the hydrazino groups in the hydrazine compound (B) is 0.5 to 2 mole equivalents per mole equivalent of the carbonyl groups in the copolymer (A).

15. The aqueous resin composition of claim 1, which is packaged in one-pack.

16. A coating prepared by applying and drying the aqueous resin composition of claim 1.

17. A coating containing (A) a copolymer of (a) a monomer having one or more aldehyde groups or ketone groups, and a radical polymerizable unsaturated bond, in a molecule, with (b) a monomer having a radical polymerizable unsaturated bond copolymerizable with the monomer (a);

said coating having a structure crosslinked with a structural unit of the following formula (2):

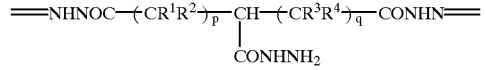

where $R^1$, $R^2$, $R^3$ and $R^4$ independently represent a hydrogen atom, or a hydroxyl group, p denotes 0 or an integer of 1 to 3, and q denotes an integer of 2 to 8, provided that the relationships $p+q \leqq 8$ and $p<q$ are satisfied.

* * * * *